US008040553B2

(12) United States Patent
Tsujimoto

(10) Patent No.: US 8,040,553 B2
(45) Date of Patent: Oct. 18, 2011

(54) IMAGE FORMING APPARATUS CAPABLE OF BOOKLET PRINTING

(75) Inventor: Shohei Tsujimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1146 days.

(21) Appl. No.: 11/770,131

(22) Filed: Jun. 28, 2007

(65) Prior Publication Data

US 2008/0002227 A1 Jan. 3, 2008

(30) Foreign Application Priority Data

Jun. 29, 2006 (JP) ................................ 2006-179845

(51) Int. Cl.
*G06K 15/00* (2006.01)

(52) U.S. Cl. ..................... 358/1.18; 358/1.16; 358/1.17; 358/404; 358/444

(58) Field of Classification Search ................. 358/1.16, 358/1.17, 1.18, 404, 444; 710/52, 53, 56
See application file for complete search history.

(56) References Cited

U.S. PATENT DOCUMENTS

| | | | | |
|---|---|---|---|---|
| 5,734,482 | A * | 3/1998 | Miyamoto et al. | 358/444 |
| 6,307,637 | B1 * | 10/2001 | Kujirai | 358/1.11 |
| 7,260,778 | B2 * | 8/2007 | Baron et al. | 715/248 |
| 7,619,770 | B2 * | 11/2009 | Park | 358/1.18 |
| 2002/0016799 | A1 * | 2/2002 | Nakagiri et al. | 707/517 |

FOREIGN PATENT DOCUMENTS

| | | | |
|---|---|---|---|
| JP | 7050738 | | 2/1995 |
| JP | 7203121 | | 8/1995 |
| JP | 8-079418 | A | 3/1996 |
| JP | 2004-153574 | A | 5/2004 |
| JP | 2004153574 | A * | 5/2004 |
| JP | 2004-287865 | A | 10/2004 |

OTHER PUBLICATIONS

JP Office Action dtd Dec. 9, 2008, JP Appln. 2006-179845 (partial translation).
JP Office Action dtd May 13, 2008, JP Appln. 2006-179845.

* cited by examiner

*Primary Examiner* — King Poon
*Assistant Examiner* — Jacky X Zheng
(74) *Attorney, Agent, or Firm* — Banner & Witcoff, Ltd

(57) ABSTRACT

An image forming apparatus that performs booklet printing is provided which includes an information acquisition device, an image data acquisition device, a storage device, and an execution device. The information acquisition device acquires a total number of pages of image data to be printed. The image data acquisition device sequentially acquires the image data by page unit. The storage device stores the image data acquired by the image data acquisition device. The execution device sequentially executes printing of the image data for four pages to be printed on one and same sheet as collected, when the image data for (2N+2) pages or above are stored in the storage device, where N is a positive integer corresponding to a number of sheets necessary for booklet printing of the total number of pages acquired by the information acquisition device.

20 Claims, 10 Drawing Sheets

IMAGE FORMING APPARATUS CAPABLE OF BOOKLET PRINTING

CROSS-REFERENCE TO RELATED APPLICATIONS

This application claims the benefit of Japanese Patent Application No. 2006-179845 filed Jun. 29, 2006 in the Japan Patent Office, the disclosure of which is incorporated herein by reference.

TECHNICAL FIELD

This invention relates to an image forming apparatus that performs booklet printing.

BACKGROUND

There is a known conventional image forming apparatus which performs booklet printing. In booklet printing, image for two pages are printed on each front and back side of a plurality of sheets. The plurality of sheets printed as such are stacked, folded into two, and bound to create a booklet.

As shown in FIG. 9, image data for four pages printed on one recording sheet are not in serial page order. Thus, it is necessary to sort and combine the image data before printing. In FIG. 9, N represents a total number of prints.

Accordingly, a commonly used image forming apparatus stores all the image data (i.e., image data for all the pages of one booklet) subject to booklet printing once in memory. Then, sorting and combining the image data are started.

SUMMARY

The present invention provides an image forming apparatus that enables reduction of memory capacity for storing image data for booklet printing.

DETAILED DESCRIPTION

<General Overview>

It is desirable that an image forming apparatus of the present invention that performs booklet printing includes an information acquisition device, an image data acquisition device, a storage device, and an execution device. In booklet printing, a plurality of sheets, each sheet with image for two pages printed on each front and back side thereof, are stacked, folded into two and bound to create a booklet. The information acquisition device acquires a total number of pages of image data to be printed. The image data acquisition device sequentially acquires the image data by page unit. The storage device stores the image data acquired by the image data acquisition device. The execution device sequentially executes printing of the image data for four pages to be printed on one and same sheet as collected, when the image data for (2N+2) pages or above are stored in the storage device, where N is a positive integer corresponding to a number of sheets necessary for booklet printing of the total number of pages acquired by the information acquisition device.

According to the image forming apparatus of the present invention, booklet printing can be executed if only the image data for (2N+2) pages can be stored. It is not necessary to read all the image data (for maximum of 4N pages) to be printed as booklet. This is because, after the image data for 2N pages are stored in the storage device, printing of image data for one sheet can be performed each time the image data for further two pages are stored.

That is, if there is an upper limit for the total number of pages printable as booklet, memory capacity for storing the image data can be reduced as compared to conventional apparatus. If the memory capacity is the same as that of the conventional apparatus, booklet printing of more number of pages can be achieved in the present invention.

<Illustrative Aspects>

First Embodiment

An image forming apparatus 1 of the present embodiment is a so-called multi function apparatus having a printer function, a scanner function, a copying function, and a facsimile function.

<Overall Structure of Image Forming Apparatus>

Figure 1:
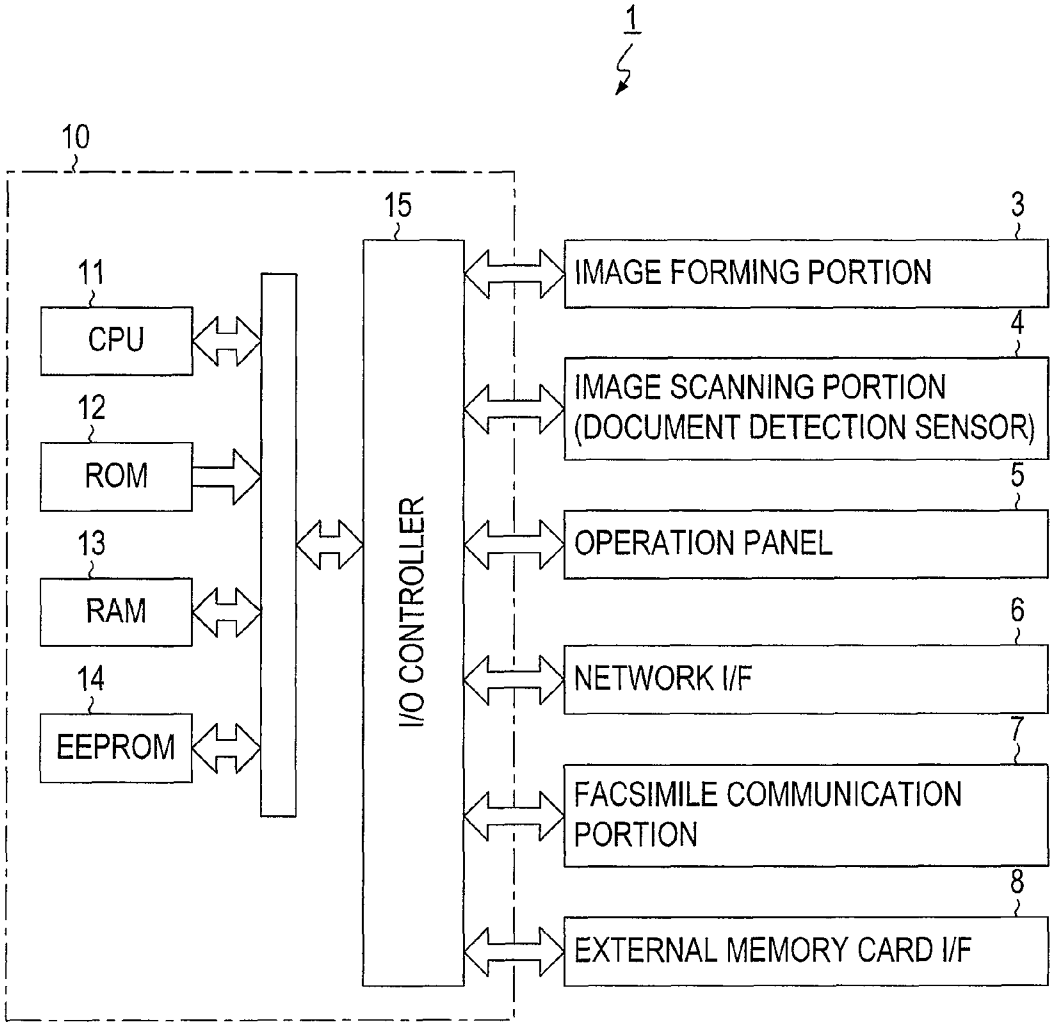
FIG. 1 is a block diagram showing a structure of an image forming apparatus of the present invention.

Referring to FIG. 1, the image forming apparatus 1 of the present embodiment includes an image forming portion 3, an image scanning portion 4, an operation panel 5, a network interface (I/F) 6, a facsimile communication portion 7, an external memory card I/F 8, and a control portion 10. The image forming portion 3 prints image information on a print medium like a sheet. The image scanning portion 4 reads the image information recorded on a document. The operation panel 5 is provided with cursor keys, switches, and a liquid crystal display panel. The cursor keys and the switches are used to provide various settings and commands. The crystal display panel displays menu windows including various menu items, user inputs and various notifications to a user. The network I/F 6 is used for input and output of image data between the image forming apparatus 1 and an external apparatus (e.g., personal computer) via a communication network such as LAN. The facsimile communication portion 7 is used to communicate image data via a general public line. The external memory card I/F 8 includes card slots, etc. for attaching various storage media. The control portion 10 controls various portions of the apparatus according to commands and settings provided via the operation panel 5 to achieve the printer function, the scanner function, the copying function, and the facsimile function.

The image forming portion 3 performs known ink-jet image formation. The image scanning portion 4 is capable of continuously reading a plurality of documents. A document detection sensor is provided on a feeder tray, and detects the number of pages from thickness of the document. The documents before reading are placed on the feeder tray.

The operation panel 5, the network I/F 6, the facsimile communication portion 7, and the external memory card I/F 8 are the same as those well known. Thus, detailed explanation thereof will not be given.

It should be noted, however, that the operation panel 5 is designed such that at least a command to perform booklet printing can be provided therefrom.

The control portion 10 mainly includes a known microcomputer provided with a CPU 11, a ROM 12, and a RAM 13. The control portion 10 further includes an EEPROM 14, and an I/O controller 15. The EEPROM 14 stores various setting information, etc. to be retained even in the case of power cut. The I/O controller 15 controls input and output of various signals among the respective portions 3 to 8.

The RAM 13 is provided at least with a buffer area that stores, per page unit, image data provided via the image scanning portion 4, the network I/F 6, the facsimile communication portion 7, and the external memory card I/F 8 and compressed.

<Booklet Print Process>

Now, a booklet print process executed by the CPU 11 will be explained by way of flowcharts shown in FIGS. 2 and 3.

The booklet print process is started when a command to execute booklet printing (hereinafter, referred to as an "execution command") is entered via the operation panel 5. The execution command includes at least information that specifies a destination (e.g., the image scanning portion 4, the network I/F 6, the facsimile communication portion 7, and the external memory card I/F 8) from which image data is acquired.

Figure 2:
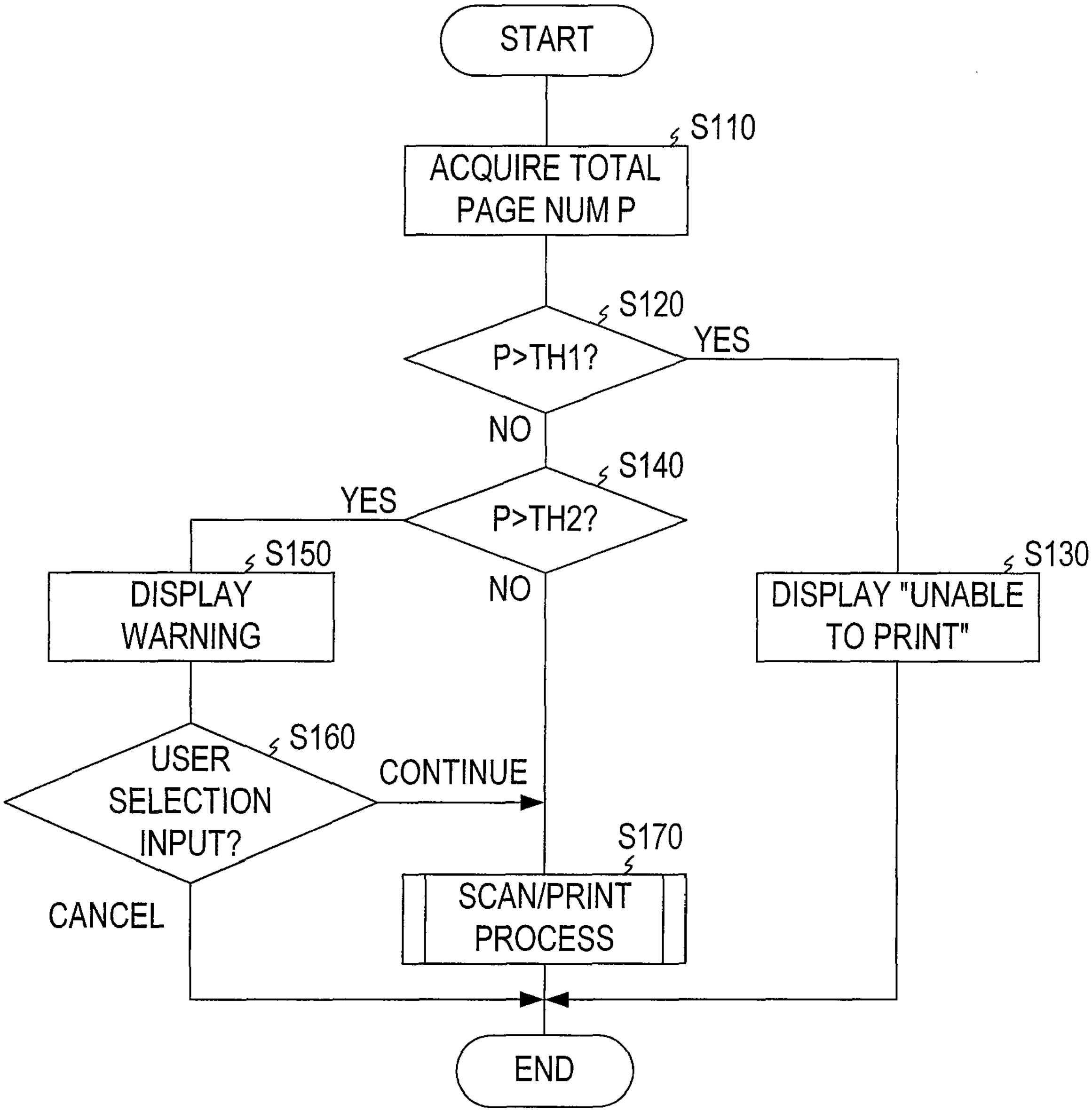
FIG. 2 is a flowchart illustrating steps of a booklet print process.

Referring to FIG. 2, when this process is started, a total number of pages P of the image data subject to booklet printing are firstly acquired in S110.

Particularly, if the image scanning portion 4 is specified as the destination to acquire the image data in the execution command, a result of detection is obtained from the document detection sensor of the image scanning portion 4. If other portions are specified as the destination, data transmitted from the destination or stored in the destination are acquired. If the total number of pages P cannot be acquired, or if it is necessary to modify the total number of pages P, a numeric value entered via the operation panel 5 is obtained as the total number of pages P.

Next, it is determined in S120 whether the obtained total number of pages P is larger than a predetermined first threshold TH1. If it is determined that the total number of pages P is larger than the first threshold TH1, a message is displayed on the operation panel 5 in S130 which notifies a user that booklet printing cannot be executed. The present process is ended.

On the other hand, if the total number of pages P is equal to or smaller than the first threshold TH1, it is determined in S140 whether the total number of pages P is larger than a predetermined second threshold TH2 (<TH1). If it is determined that the total number of pages P is larger than a predetermined second threshold TH2, a warning is displayed in S150 which notifies the user that booklet printing may not be able to be executed, and urges the user to select whether to continue or cancel the booklet print process.

In subsequent S160, if selection by the user via the operation panel 5 is to "cancel", the process is ended. If selection by the user is to "continue", the process moves to S170.

In S170, a scan/print process is executed in which image data for booklet printing are read and printed. The present process is ended.

In case that the buffer area in the RAM 13 can store compressed image data for Q1 pages composed of only character, or compressed image data (or ordinary image data) for Q2 pages composed of only image, the first and second thresholds TH1 and TH2 will be determined by the following equations.

$$TH1=(Q1-2)\times 2 \quad (1)$$

$$TH2=(Q2-2)\times 2 \quad (2)$$

That is, in case that the total number of pages P is as large as that booklet printing cannot be performed (P>TH1), a message is displayed which indicates that booklet printing cannot be executed. The present process is ended without performing the scan/print process. In case that the total number P is as large as that booklet printing may not be able to be performed depending on image data to read (P>TH2), a warning is displayed and whether to continue or cancel the execution of booklet printing is left to selection by the user.

<Detail of Scan/Print Process>

Figure 3:
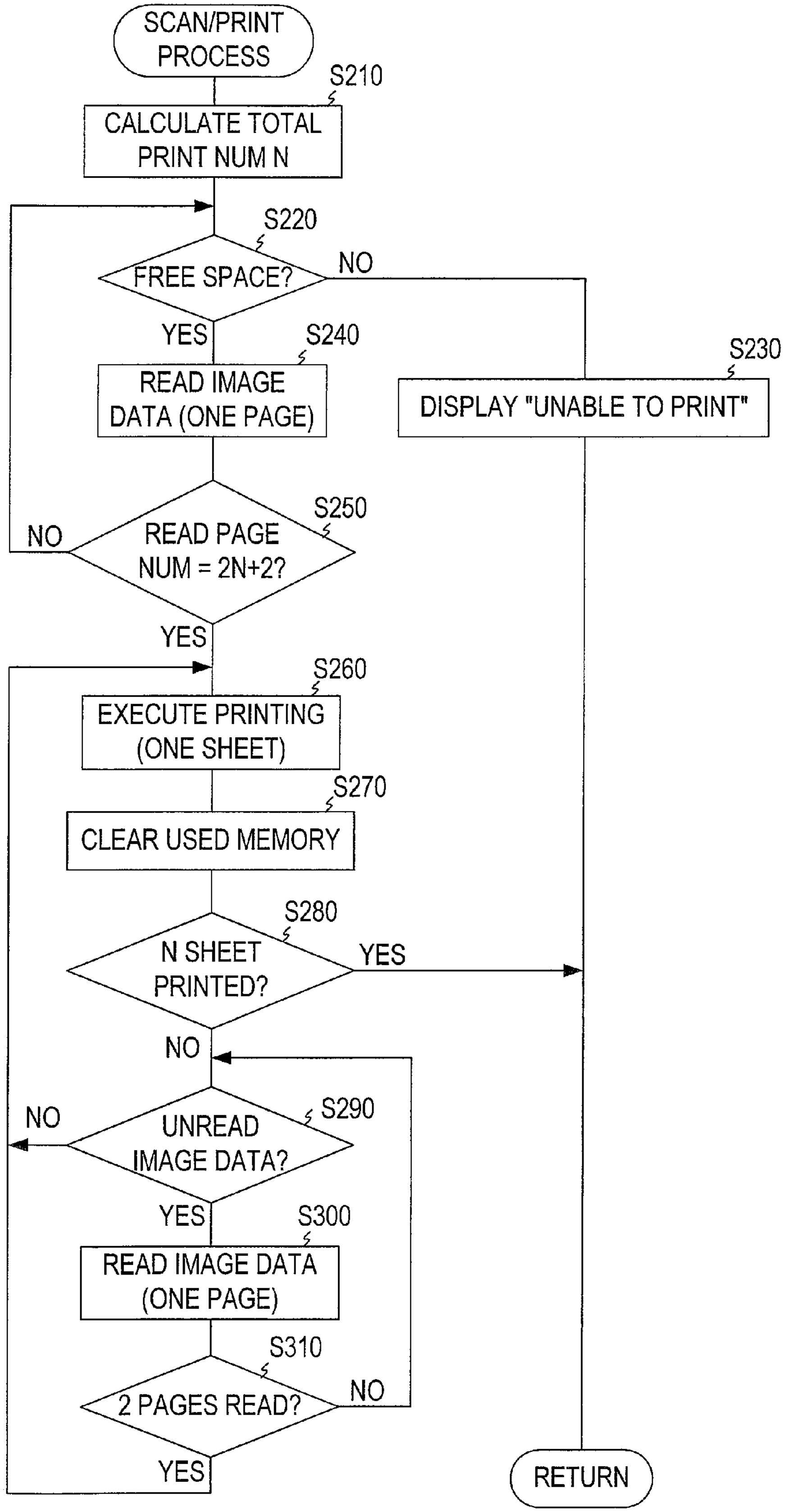
FIG. 3 is a flowchart illustrating steps of a scan/print process according to a first embodiment.

Referring to FIG. 3, when the scan/print process in S170 is started, a total number of prints N is calculated in S210 based on the total number of pages P obtained in previous S110. Particularly, the total number of pages P is divided by four, which is the number of pages to be printed on each sheet. A quotient of the division is rounded up to make the total number of prints N. That is, in case that the total number of prints is N, the total number of pages P is one of 4N−3, 4N−2, 4N−1, and 4N.

In subsequent S220, it is determined whether there is free space sufficient to store compressed image data for one page (a maximum of image data composed only of image is assumed) in the buffer area of the RAM 13. If not, a message is displayed in S230 which notifies that booklet printing cannot be performed on the operation panel 5 to end the present process.

On the other hand, if there is free space in the buffer area, the image data for one page are read from the destination to acquire the image data which is specified by the execution command, and the read image data is compressed and stored in the buffer area in S240.

In subsequent S250, it is determined whether the number of pages of the image data stored in the buffer area has reached (2N+2) pages. If not, the process returns to S220 and repeats the steps of S220 to S250. If the number of pages read into the buffer area has reached (2N+2) pages, the process moves to S260.

In S260, sorting and combining of image data for four pages to be printed on one and same recording sheet (hereinafter, "printable data") are performed to have the image forming portion 3 to print the image data on front and back sides of one recording sheet. In subsequent S270, the buffer area storing the printed image data and no longer required is cleared so that storage of new image data is enabled. The process moves to S280.

In S260, sorting and combining are performed so that, on a recording sheet to be printed on the nth (n=1, 2, . . . , N), data for the (2N−1−2×(n−1))th and (2N+2+2×(n−1))th pages are laid out on one side, and data for the (2N−2×(n−1))th and (2N+1+2×(n−1))th pages are laid out on the other side.

In S280, it is determined whether printing of the total number of prints N is completed. If printing of N sheets is completed, the present process is ended. If not, the process moves to S290 and it is determined whether there is any unread image data.

If there is no unread image data, the process returns to S260 to execute printing even though image data for four pages are not collected. If there is unread image data, image data for one page are read in S300. It is determined in S310 whether image data for two pages have been read after execution of the previous printing.

If image data for two pages are not read, the process returns to S290 to repeat the steps of S290 to S310. If image data for two pages are already read, the process returns to S260 to execute printing.

Figure 5A:
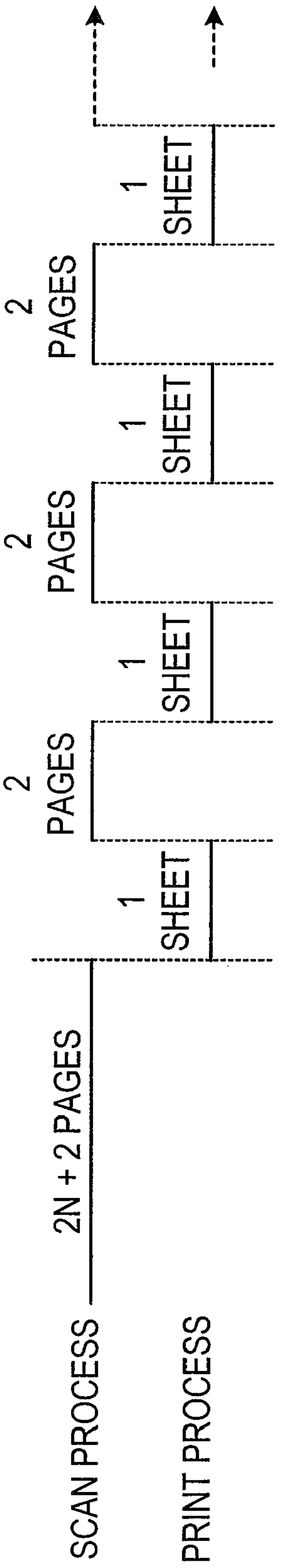
FIGS. 5A and 5B are timing charts illustrating operation timings of the scan process and the print process in the first and the second embodiments.

That is, in the present process, if there is a lack of free space in the buffer area before the number of read pages reaches (2N+2) pages (S220: NO), booklet printing cannot be executed. A message is displayed which indicates that printing cannot be performed (S230). Also, in the present process, as shown in FIG. 5(A), when the number of read pages reaches (2N+2) pages (S250: YES), printing of one recording sheet is enabled and printing is executed. Thereafter, each time new image data for two pages are read (S310: YES), printing of one recording sheet is executed one after another.

However, in printing of the Nth recording sheet (the last one or two sheets), there may be a lack of image data for one or two pages. Therefore, even if there is no unread image data or there is unread image data for only one page (S290: NO), printing is executed.

<Effect>

As noted above, in the image forming apparatus 1 of the present embodiment, printing is started as soon as image data for (2N+2) pages are read. Also, the buffer area is immediately cleared which stores the printed image data so that the buffer area can be used for reading of new image data.

Therefore, according to the image forming apparatus 1 of the present embodiment, even if there is no buffer area sufficient to store image data for the total number of pages P (=4N−3, 4N−2, 4N−1, and 4N), booklet printing can be executed if there is a buffer area sufficient to store image data for about a half of the total number of pages P, that is, (2N+2) pages.

As a result, in case that there is an upper limit in the total number of pages P, capacity of the buffer area (and the RAM 13) can be reduced as compared to conventional apparatus. Also, if the capacity of the buffer area is the same, booklet printing of the more number of pages can be executed in the image forming apparatus 1 than in the conventional apparatus.

Also, in the image forming apparatus 1 of the present embodiment, in case that the total number of pages P is as large as that booklet printing cannot be executed (P>TH1), a message is displayed which indicates that booklet printing cannot be executed. The present process is ended without execution of the scan/print process.

Thus, according to the image forming apparatus 1 of the present embodiment, image data can be prevented from being read in vain although booklet printing cannot be performed.

Also, in the image forming apparatus 1 of the present embodiment, in case that the total number of pages P is as large as that booklet printing may not be able to be executed depending on size of image data per page (TH1>P>TH2), a warning is given accordingly. At the same time, the user is given choice of whether to continue or cancel booklet printing.

Thus, according to the image forming apparatus 1 of the present embodiment, even if the total number of pages P is large, continuance/cancellation of booklet printing can be flexibly dealt with, depending on characteristics of image data to be printed as booklet.

Second Embodiment

Now, the second embodiment will be described.

The present embodiment is different from the first embodiment in part of the steps in the scan/print process. Accordingly, the steps having difference will be mainly explained.

Figure 4:
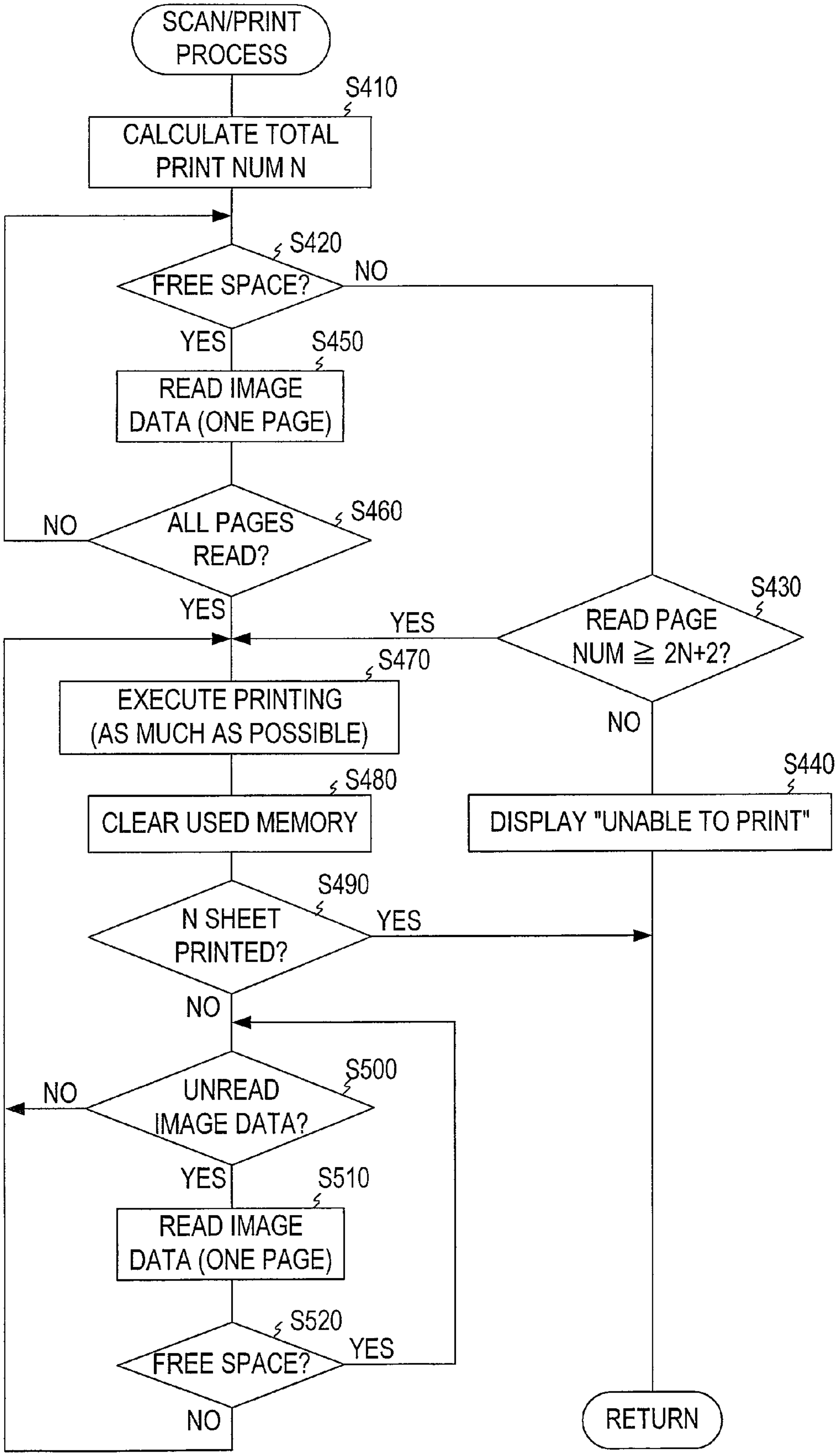
FIG. 4 is a flowchart illustrating steps of a scan/print process according to a second embodiment.

FIG. 4 is a flowchart showing details of a scan/print process in the present embodiment.

As shown in FIG. 4, when the process is started, the total number of prints N is calculated in S410 based on the total number of pages P obtained in the previous step of S110 in the same manner as in S210.

In subsequent S420, it is determined whether there is free space sufficient to store compressed image data for one page (a maximum of image data composed only of image is assumed) in the buffer area of the RAM 13. If there is sufficient free space, the image data for one page are read from the destination to acquire the image data which is specified by the execution command, and the read image data are compressed and stored in the buffer area in S450.

In subsequent S460, it is determined whether image data for all pages (total number of pages P) has been read. If not, the process returns to S420 and repeats reading of image data as long as there is free space in the buffer area. Otherwise, the process moves to S470.

In the previous step of S420, if it is determined that there is no sufficient free space in the buffer area, it is determined whether the number of pages read in the buffer area in S430 is (2N+2) or above. If the number of read pages is (2N+2) or above, the process moves to S470. Otherwise, a message is displayed on the operation panel 5 in S440 which notifies that booklet printing cannot be performed. The present process is ended.

In S470, sorting and combining of printable data (image data for four pages to be printed on one and the same recording sheet) are performed to have the image forming portion 3 to print all the printable data in order of a data set collected. In subsequent S480, the buffer area storing the printed image data and no longer required is cleared so that storage of new image data is enabled. The process moves to S490.

In S490, it is determined whether printing of the total number of prints N is completed. If printing of N sheets is completed, the present process is ended. If not, the process moves to S500 and it is determined whether there is any unread image data.

At this time, if there is no unread image data, the process returns to S470 to execute printing although image data for four pages are not collected. If there is unread image data, image data for one page are read in S510. It is determined in S520 whether there is free space in the buffer area.

If there is free space in the buffer area, the process returns to S500 to repeat the steps of S500 to S520. Otherwise, the process returns to S470 to execute printing.

Figure 5B:
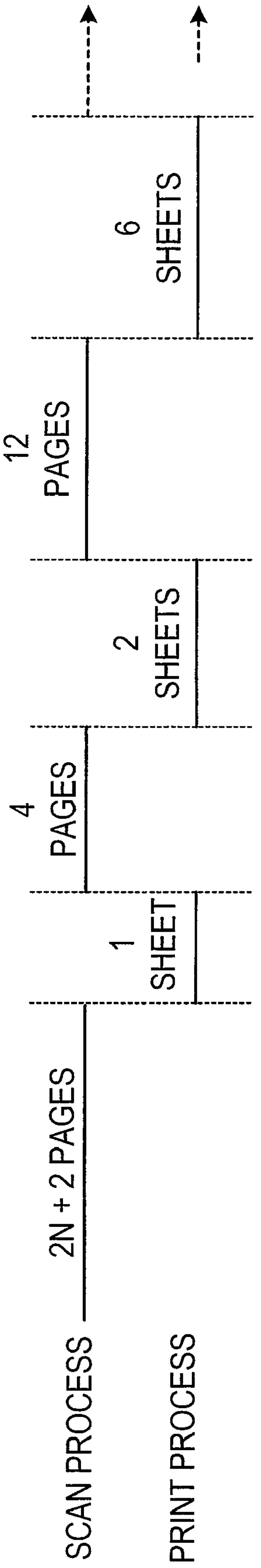

That is, in the present process, as much image data as possible are read into the buffer area. If there is a lack of free space in the buffer area before the number of read pages reaches (2N+2) pages (S430: NO), booklet printing cannot be executed. A message indicating that printing cannot be performed is displayed (S440). Also, in the present process, as shown in FIG. 5(B), when the number of read pages reaches (2N+2) pages or above (S430: YES or S460: YES), printing of all the printable data is executed (S470). Thereafter, reading of as much image data as possible into the buffer area (S500 to S520), and printing of all the printable data (S470 to S490) are alternately repeated.

The capacity of the buffer area cleared at a time and the number of prints printed in succession at a time are increased as the printing proceeds. FIG. 5(B) is an example when only (2N+2) pages can be read at first.

<Effect>

As noted above, in the image forming apparatus 1 of the present embodiment, printing is started after as much image data as possible are stored in the buffer area. Printing of a plurality of pages is executed in succession. Therefore, the number of times to start and stop the image forming portion 3 can be reduced. The image forming portion 3 can be efficiently operated.

Third Embodiment

Now, the third embodiment will be explained.

The present embodiment is different from the first and second embodiments in part of the steps in the scan/print process. Accordingly, the steps having difference will be mainly explained. The first and second embodiments show cases in which only one of either scan process or print process of image data is exclusively executed. The present embodiment shows a case in which the both processes are executed in parallel.

In the present embodiment, a scan process to be later explained is started in the previously described S170, instead of the scan/print process.

<Detail of Scan Process>

Figure 6:
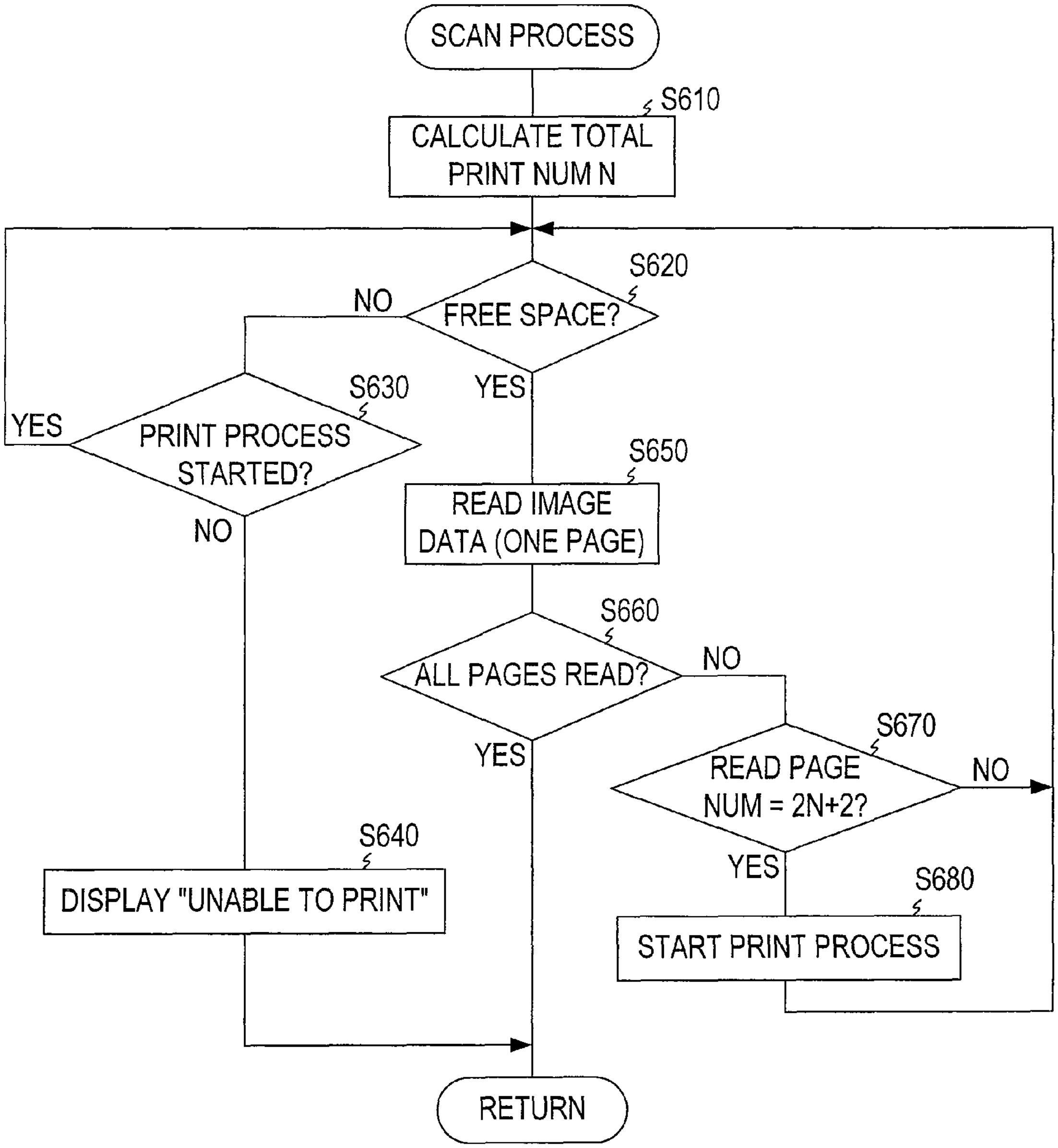
FIG. 6 is a flowchart illustrating steps of a scan process according to a third embodiment.

FIG. 6 is a flowchart showing steps of the scan process.

When the scan process is started, the total number of prints N is calculated in S610 based on the total number of pages P acquired in previous S110, as in S210, as shown in FIG. 6.

In subsequent S620, it is determined whether there is free space sufficient to store compressed image data for one page (a maximum of image data composed only of image is assumed) in the buffer area. If there is free space in the buffer area, the image data for one page are read from the destination to acquire the image data which is specified by the execution command, and the read image data are compressed and stored in the buffer area in S650.

In subsequent S660, it is determined whether reading of image data for all pages (total number of pages P) is completed. If completed, the present process is ended. Otherwise, the process moves to S670.

In S670, it is determined whether the number of pages of image data read into the buffer area is (2N+2). If not, the process returns to S620. Otherwise, a later explained print process is started in S680. The process returns to S620.

In the previous step of S620, if it is determined that there is no sufficient free space in the buffer area, it is determined whether the print process is already started in S630. If the print process is already started, the present process returns to S620. Otherwise, a message is displayed on the operation panel 5 in S640 which notifies that booklet printing cannot be performed. The present process is ended.

<Detail of Print Process>

Figure 7:
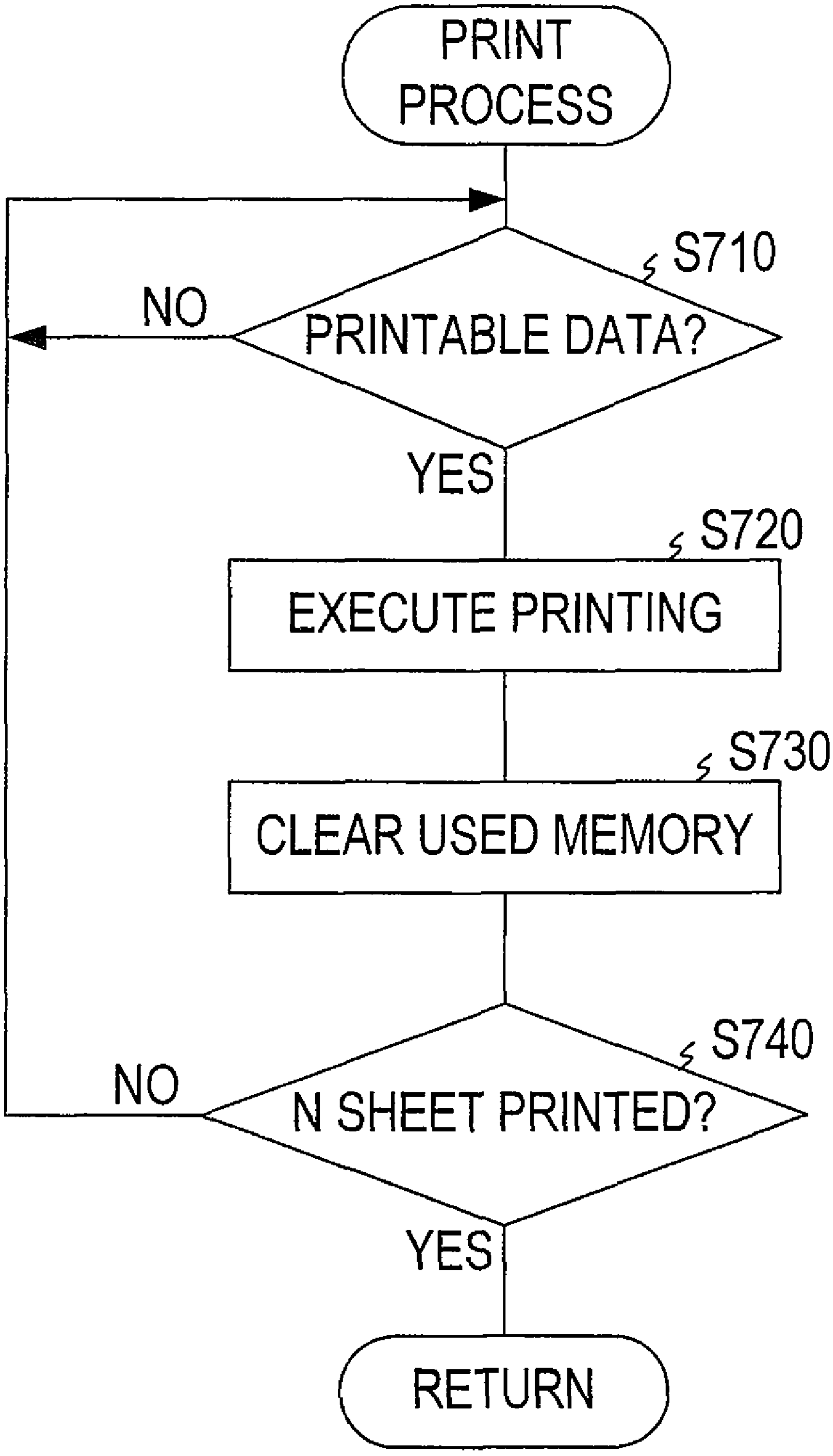
FIG. 7 is a flowchart illustrating steps of a print process according to the third embodiment.

FIG. 7 is a flowchart showing steps of the print process.

When the print process is started, it is determined whether there is printable data in the buffer area in S710, as shown in FIG. 7. If not, the step of S710 is repeated to stand by. If printable data is found, the process moves to S720.

In S720, all the printable data are printed by the image forming portion 3. In subsequent S730, the buffer area storing the printed image data and no longer required is cleared. The process moves to S740.

In S740, it is determined whether printing of the total number of prints N is completed. If not, the process returns to S710 to repeat the above steps of S710 to S740. If printing of N sheets is completed, the present process is ended.

That is, in the present embodiment, until image data for (2N+2) pages are read, only the scan process is executed. After image data for (2N+2) pages are read, both the scan process and the print process are executed in parallel.

Figure 8A:
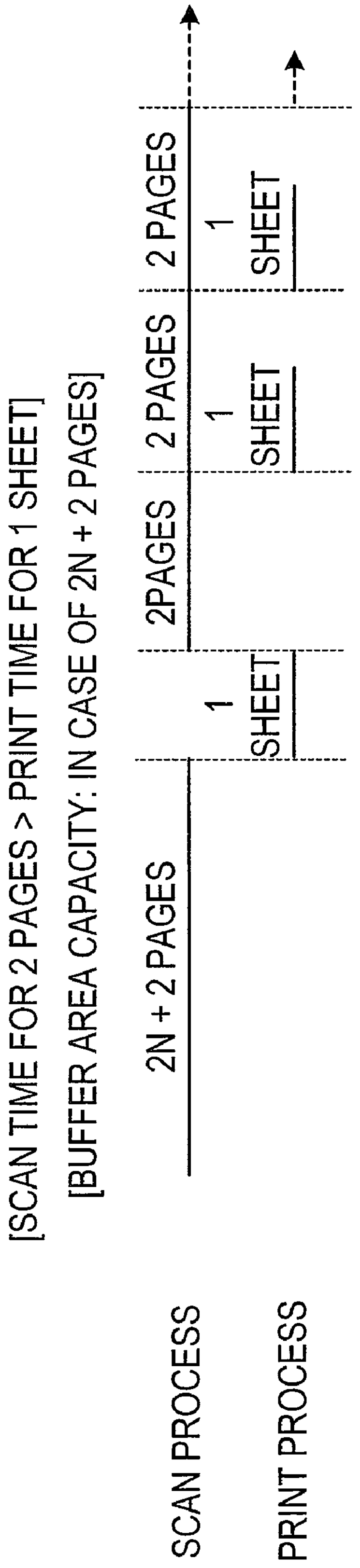
FIGS. 8A to 8D are timing charts illustrating operation timings of the scan process and the print process in the third embodiment.
Figure 8B:
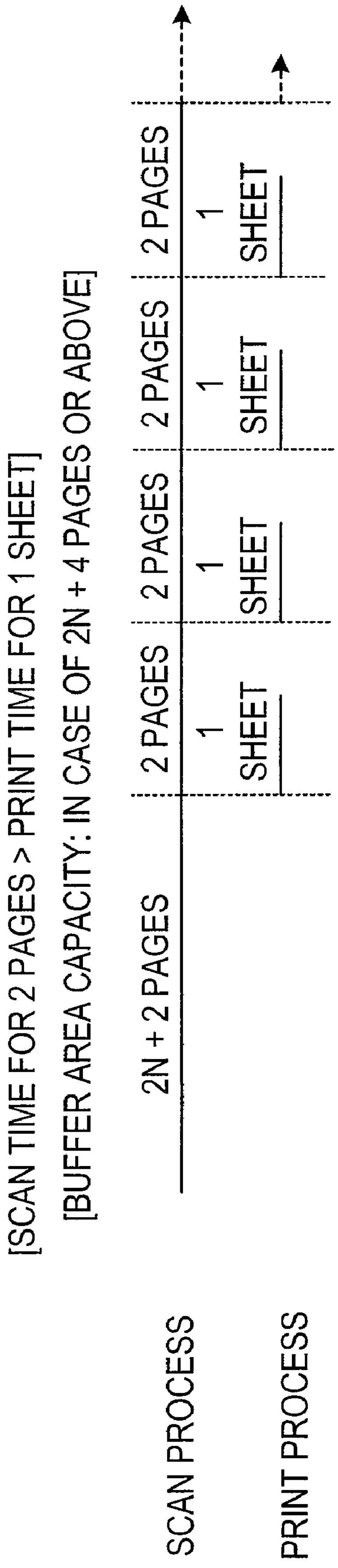

If reading of image data for two pages requires more time than printing of image data for one recording sheet (i.e., image data for four pages), operation is performed as shown in FIGS. 8A and 8B.

That is, if the capacity of the buffer area is just as much as that can store image data for (2N+2) pages, the scan process is interrupted when image data for (2N+2) pages are read, as shown in FIG. 8A. The print process for a first sheet is executed. When the print process is completed, the buffer area storing image data for four pages is cleared. Thus, the scan process is restarted. Thereafter, each time image data for two pages are read, the print process is executed. After the print process for a second sheet, there is free space for more than two pages in the buffer area. Accordingly, the scan process thereafter is executed in succession without interruption.

If the capacity of the buffer area is enough to store image data for (2N+4) pages or above, there is free space for image data for two pages in the buffer area, as shown in FIG. 8B, at the time of execution of the print process for the first sheet. Thus, the scan process is executed in succession without interruption even at the time of the print process for the first sheet.

Figure 8C:
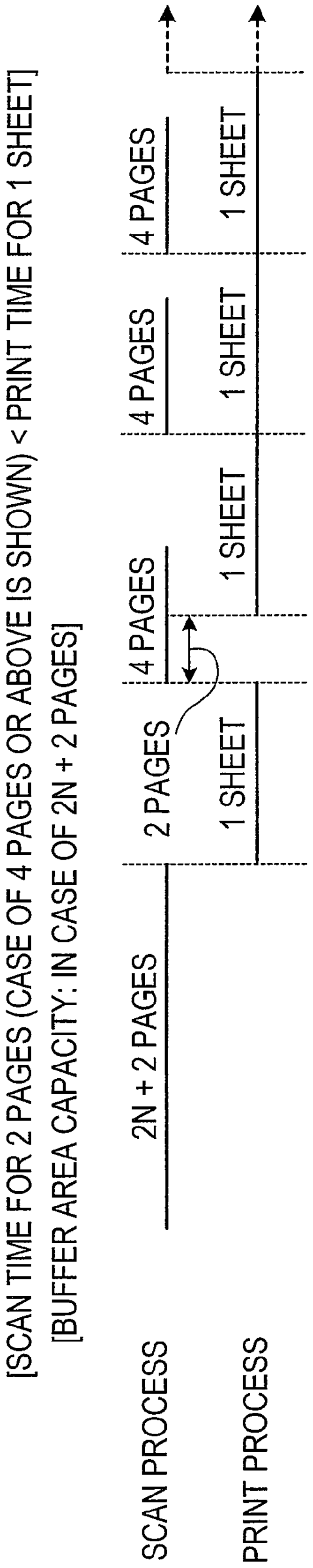
Figure 8D:
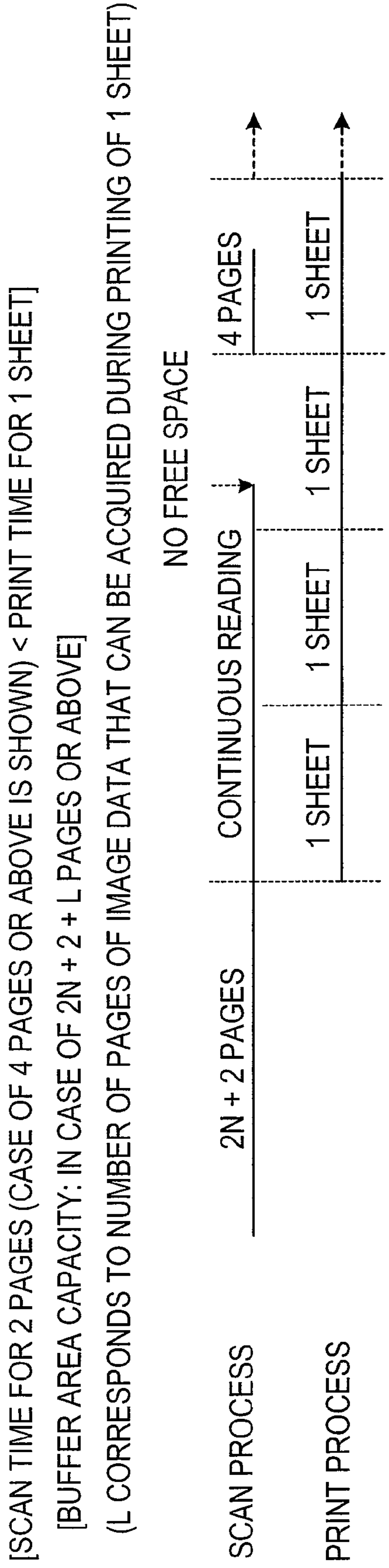
Figure 9:
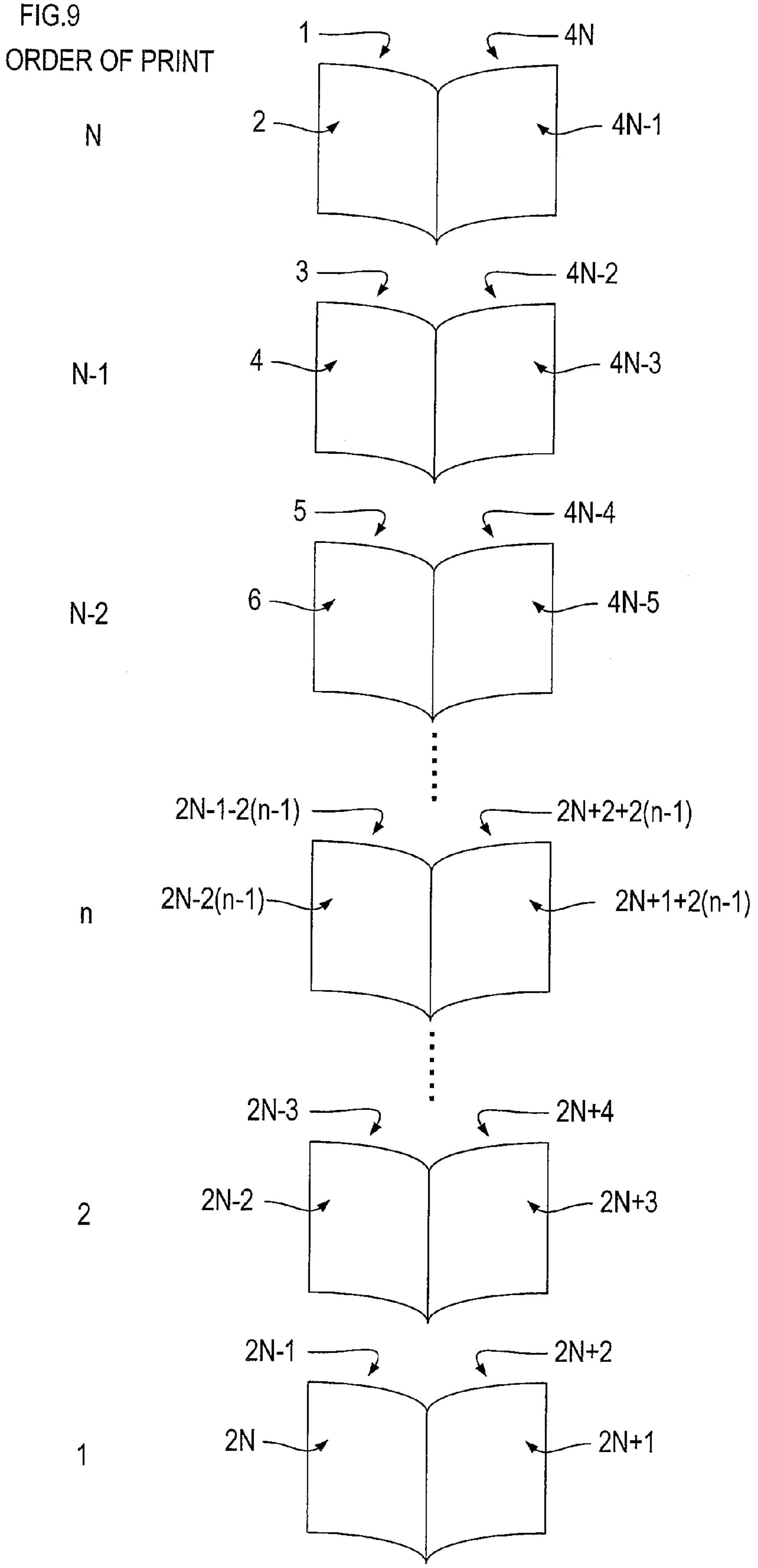
FIG. 9 is an explanatory view showing layouts of booklet printing.

On the other hand, if it takes more time to print image data for one recording sheet than to read the image data for two pages, the operation will be as shown in FIGS. 8C and 8D. In FIGS. 8C and 8D, a case is shown in which image data for four pages or above are readable while the print process for one sheet of image data is executed.

That is, if the capacity of the buffer area is as large as to be able to store image data for just (2N+2) pages, the scan process is interrupted and the print process for the first sheet is executed once image data for (2N+2) pages are read, as shown in FIG. 8C. When the print process is completed, the buffer area storing image data for four pages is cleared. Thus, reading of image data is restarted. However, there is no more free space in the buffer area as image data for four pages are newly read. Thus, the scan process is again interrupted. Also, at this time, as the image data for two pages are read, the print process for the second sheet is executed.

After the print process for the second sheet is completed, the buffer area storing image data for four pages is cleared. Thus, the interrupted scan process is restarted and, since printable data is already stored in the buffer area at this point, the print process for a third sheet is continuously performed. Thereafter, the print process is executed in succession without interruption. Each time the print process for one sheet of image data is completed, the scan process for image data for four pages is executed intermittently.

In case, however, that the number of pages of image data that can be read during the print process for one sheet of image data is two or above but less than four pages, it is considered that the speed of clearing the buffer area is faster than the speed of reading image data. Therefore, the scan process restarted after the print process for the first sheet will be continued without interruption.

The number of pages of image data that can be acquired during the execution of the print process for one sheet of image data is set to be L. If the capacity of the buffer area is large enough to store image data for (2N+2+L) pages or above, the print process for the first sheet is executed as the image data for (2N+2) pages are read, as shown in FIG. 8D. At this point, since there is free space for L pages or more of image data in the buffer area, the print process is continued without interruption. Also, the printable data is already stored in the buffer area at the time when the print process for one sheet of image data is completed. Thus the print process for the second sheet is continuously performed. Thereafter, the print process is continued without interruption. The scan process is also continuously performed until there is no space in the buffer area. When there is no free space in the buffer area, the scan process is interrupted. Thereafter, each time the print process for one sheet of image data is completed, the scan process for four pages of image data will be intermittently performed.

In case, however, that the number of pages of image data that can be read during the print process for one sheet of image data is two pages or above but less than four pages, there would not be a case in which there is no free space in the buffer area as noted above. The scan process is continued without interruption.

If the image forming portion 3 is designed to print by laser, the operation of the image forming apparatus 1 may correspond to the operation as shown in FIGS. 8A and 8B since "print time for one sheet of image data"<"scan time for two pages of image data". If the image forming portion 3 is designed to print by inkjet, the operation of the image forming apparatus 1 may correspond to the operation as shown in FIGS. 8C and 8D since "print time for one sheet of image data">"scan time for two pages of image data".

<Effect>

According to the image forming apparatus 1 of the present embodiment, not only the same effects will be obtained as in the first and the second embodiments but also a booklet printing process can be executed in minimum necessary time.

In the present embodiment, the print process is started as soon as image data for (2N+2) pages are stored. However, the print process may be started when as much image data as possible are stored in the buffer area. In this case, the number of times in which starting and stopping of the image forming portion 3 can be reduced even in case that the scan time is longer than the print time.

[Other Aspects]

Several aspects of the present invention are described in the above. However, it should be noted that the present invention is not limited by the above aspects and can be practiced in various manners without departing from the scope of the present invention.

For instance, in the above aspects, the total number of pages P is acquired from the destination to acquire the image data which is specified by the execution command. However, the total number of pages P can be a value entered from the operation panel 5.

In the above aspects, the acquired image data are compressed and stored in the buffer area. However, the image data may be stored without being compressed.

In this case, image data for each page has the same data amount. Whether or not booklet printing can be executed can be accurately determined based on the total number of pages P. Thus, the process steps can be further simplified.

What is claimed is:

1. An image forming apparatus that performs booklet printing, comprising:

at least one processor;

a storage device; and memory storing computer-readable instructions that, when executed, cause the at least one processor to provide:

an information acquisition device that acquires a total number of pages of image data to be printed;

an image data acquisition device that sequentially acquires the image data by page unit from a first page to a last page and stores, in the storage device, the acquired image data;

a determination device that determines whether the image data for (2N+2) pages or above are stored in the storage device upon each acquisition of the image data, wherein N is a positive integer corresponding to a number of sheets necessary for booklet printing of the acquired total number of pages;

an execution device that sequentially causes execution of printing of the image data for four pages to be printed on one and same sheet as collected, when it is determined by the determination device that the image data for (2N+2) pages or above are stored in the storage device; and a clearance device that clears a storage area of the storage device which stores the image data for which execution of printing has been caused by the execution device, wherein the image data acquisition device is configured to interrupt the data acquisition when storage of the image data by the storage device is not possible, and wherein the image data acquisition device is further configured to restart the interrupted data acquisition when the storage area is cleared by the clearance device.

2. The image forming apparatus according to claim 1, wherein a plurality of sheets, each sheet with image for two pages printed on each front and back side thereof, are stacked, folded into two and bound to create a booklet in the booklet printing.

3. The image forming apparatus according to claim 1, wherein the execution device causes printing to start as the image data is stored until there is no more free space to store the image data in the storage device.

4. The image forming apparatus according to claim 1, wherein the memory stores additional computer-readable instructions that, when executed, further cause the at least one processor to provide:

a prohibition device that prohibits operation of the image data acquisition device if the total number of pages acquired by the information acquisition device is larger than a predetermined number of pages.

5. The image forming apparatus according to claim 4, wherein the predetermined number of pages corresponds to a number of calculated pages that are estimated to be storable in free space of the storage device.

6. The image forming apparatus according to claim 1, wherein the memory stores additional computer-readable instructions that, when executed, further cause the at least one processor to provide:

a first notification device that provides notification that booklet printing is unable to be performed if the total number of pages acquired by the information acquisition device is larger than a predetermined number of pages.

7. The image forming apparatus according to claim 6, wherein the predetermined number of pages corresponds to a number of calculated pages that are estimated to be storable in free space of the storage device.

8. The image forming apparatus according to claim 1, wherein the memory stores additional computer-readable instructions that, when executed, further cause the at least one processor to provide:

a second notification device that provides notification that booklet printing is unable to be performed if the image data for (2N+2) pages or above is unable to be stored in the storage device.

9. The image forming apparatus according to claim 1, further comprising:

an image scanning device that is configured to read an image printed on each of a plurality of documents to generate the image data.

10. The image forming apparatus according to claim 9, wherein the information acquisition device includes a detection device that is configured to detect a number of sheets of the documents read by the image scanning device, and wherein the information acquisition device acquires a result of detection by the image scanning device as the total number of pages of the image data.

11. The image forming apparatus according to claim 1, wherein the image data acquisition device includes a reception device that is configured to receive the image data from an external apparatus.

12. The image forming apparatus according to claim 11, wherein the information acquisition device acquires a total number of pages of the image data from the external apparatus via the reception device.

13. The image forming apparatus according to claim 1, further comprising an input device that allows input of numeric data, wherein the information acquisition device acquires the numeric data provided by the input device as a total number of pages of the image data.

14. The image forming apparatus according to claim 1, wherein the image data acquisition device compresses the acquired image data to store the compressed image data in the storage device.

15. At least one non-transitory computer-readable medium having computer-readable instructions stored thereon that, when executed, cause at least one computing device to:

acquire a total number of pages of image data to be printed;

sequentially acquire the image data by page unit from a first page to a last page;

store, in a storage device, the acquired image data;

determine whether the image data for (2N+2) pages or above are stored in the storage device upon each acquisition of the image data, wherein N is a positive integer corresponding to a number of sheets necessary for booklet printing of the acquired total number of pages;

in response to determining that the image data for (2N+2) pages or above are stored in the storage device, sequentially execute printing of the image data for four pages to be printed on one and same sheet as collected;

clear a storage area of the storage device which stores the image data of which printing has been executed; and in response to determining that storage of the image data by the storage device is not possible, interrupt the acquisition of the image data and restart the interrupted data acquisition after the storage area is cleared.

16. The at least one non-transitory computer-readable medium of claim 15 having additional computer-readable instructions stored thereon that, when executed, further cause the at least one computing device to:

prohibit the acquisition of the image data if the total number of pages acquired is larger than a predetermined number of pages.

17. The at least one non-transitory computer-readable medium of claim 16, wherein the predetermined number of pages corresponds to a number of calculated pages that are estimated to be storable in free space of the storage device.

18. The at least one non-transitory computer-readable medium of claim 15 having additional computer-readable instructions stored thereon that, when executed, further cause the at least one computing device to:

provide a notification that booklet printing is unable to be performed if the total number of pages acquired is larger than a predetermined number of pages.

19. The at least one non-transitory computer-readable medium of claim 15 having additional computer-readable instructions stored thereon that, when executed, further cause the at least one computing device to:

provide a notification that booklet printing is unable to be performed if the image data for (2N+2) pages or above is unable to be stored in the storage device.

20. A method, comprising:

acquiring a total number of pages of image data to be printed;

sequentially acquiring the image data by page unit from a first page to a last page;

storing, in a storage device, the acquired image data;

determining whether the image data for (2N+2) pages or above are stored in the storage device upon each acquisition of the image data, wherein N is a positive integer corresponding to a number of sheets necessary for booklet printing of the acquired total number of pages;

in response to determining that the image data for (2N+2) pages or above are stored in the storage device, sequentially executing printing of the image data for four pages to be printed on one and same sheet as collected;

clearing a storage area of the storage device which stores the image data of which printing has been executed; and in response to determining that storage of the image data by the storage device is not possible, interrupting the acquisition of the image data and restarting the interrupted data acquisition after the storage area is cleared.

* * * * *